United States Patent
Hinton et al.

(10) Patent No.: US 7,489,720 B2
(45) Date of Patent: Feb. 10, 2009

(54) METHOD FOR TRANSMIT PULSE DESIGN FOR ULTRA-WIDEBAND COMMUNICATIONS

(75) Inventors: Danielle Ayodele Hinton, Cambridge (GB); Anuj Batra, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 623 days.

(21) Appl. No.: 10/700,723

(22) Filed: Nov. 4, 2003

(65) Prior Publication Data

US 2004/0109506 A1 Jun. 10, 2004

Related U.S. Application Data

(60) Provisional application No. 60/423,697, filed on Nov. 4, 2002, provisional application No. 60/423,709, filed on Nov. 4, 2002.

(51) Int. Cl.
 *H04B 1/00* (2006.01)
(52) U.S. Cl. ........................ 375/138; 375/130
(58) Field of Classification Search ................. 375/242, 375/130, 138
 See application file for complete search history.

(56) References Cited

U.S. PATENT DOCUMENTS

| | | | | |
|---|---|---|---|---|
| 5,818,874 | A * | 10/1998 | Lewandowski et al. | 375/257 |
| 6,449,590 | B1 * | 9/2002 | Gao | 704/219 |
| 6,583,662 | B1 * | 6/2003 | Lim | 327/553 |
| 6,937,639 | B2 * | 8/2005 | Pendergrass et al. | 375/135 |
| 2002/0022484 | A1 * | 2/2002 | Dickey | 455/446 |
| 2002/0127986 | A1 * | 9/2002 | White et al. | 455/194.2 |
| 2002/0173341 | A1 * | 11/2002 | Abdelmonem et al. | 455/561 |
| 2002/0190725 | A1 * | 12/2002 | Craven | 324/627 |
| 2003/0090436 | A1 * | 5/2003 | Schantz et al. | 343/908 |
| 2003/0227980 | A1 * | 12/2003 | Batra et al. | 375/295 |

(Continued)

FOREIGN PATENT DOCUMENTS

WO WO-01/93520 A2 12/2001

(Continued)

OTHER PUBLICATIONS

FCC, "First Report and Order", In the matter of Revision of Part 15 of the Commission's Rules Regarding Ultra-Wideband Transmission Systems, Adopted Feb. 14, 2002, released Apr. 22, 2002, Washington, D.C., US.

(Continued)

*Primary Examiner*—David B Lugo
(74) *Attorney, Agent, or Firm*—Ronald O. Neerings; Wade James Brady, III; Frederick J. Telecky, Jr.

(57) ABSTRACT

Method for designing transmission pulses for ultra-wideband communications systems. A preferred embodiment comprises specifying a spectral description for the pulse. After a spectral description is created, then an approximation of the pulse can be created and well known optimization techniques, such as the least squares technique, can be used to minimize the difference between the approximation and the pulse. If the communications system is operating in the presence of interferers, then the spectral mask can be modified to ensure that the approximation carries no signal information in frequencies corresponding to the interferers.

41 Claims, 6 Drawing Sheets

U.S. PATENT DOCUMENTS

2004/0086001 A1* 5/2004 Miao et al. ............. 370/516
2004/0136438 A1* 7/2004 Fullerton et al. ........ 375/130
2004/0137877 A1* 7/2004 Crowhurst et al. ....... 455/411
2005/0117628 A1* 6/2005 Brethour et al. ......... 375/130

FOREIGN PATENT DOCUMENTS

WO     WO-01/93520 A3    12/2001

OTHER PUBLICATIONS

Kohno, R., et al., "Project: IEEE P802.15 Working Group for Wireless Personal Area Networks (WPANs)", doc.: IEEE 802.15-03/097r1, IEEE P802.15 Alternative PHY Call For Proposals, IEEE P802.15-02/327r7, Japan, Mar. 2003.

* cited by examiner

METHOD FOR TRANSMIT PULSE DESIGN FOR ULTRA-WIDEBAND COMMUNICATIONS

This application claims the benefit of U.S. Provisional Applications No. 60/423,697, filed Nov. 4, 2002, entitled "UNII-Friendly Transmit Pulse Design for Ultra Wideband Communications" and No. 60/423,709, filed Nov. 4, 2002, entitled "Transmit Pulse Design for Ultra Wideband Communications," which applications are hereby incorporated herein by reference.

TECHNICAL FIELD

The present invention relates generally to a method for wireless communications, and more particularly to methods for designing and transmitting transmit pulses for ultra-wideband communications systems.

BACKGROUND

Ultra-wideband (UWB) communications systems are normally defined as carrier-less communications systems wherein the bandwidth of the signal being transmitted, $f_B$, is greater than or equal to 0.20 $f_c$, where $f_c$ is the center frequency of the signal being transmitted. Additionally, the UWB communications system should have a minimum bandwidth of 500 MHz. Note that the definition for UWB communications systems and devices is as defined by the Federal Communications Commission (FCC) of the United States. UWB communications systems have been around for a great number of years, and the majority of them fall under a single type of system, they modulate a stream of short-duration pulses (with an approximate duration which ranges from 0.2 nanoseconds (ns) to 2 ns), either in time (pulse position modulation (PPM)), amplitude (pulse amplitude modulation (PAM)), or phase angle (bi-phase modulation).

The FCC, in Report Order 02-48 released in February of 2002, has specified a set of spectral allocation, technical standards, and operating restrictions for several different types of UWB devices. For example, in the Report Order, the FCC specifies that indoor UWB devices may operate within a frequency range of 1.9 to 10.6 GHz while hand-held UWB devices may operate within a frequency range of 3.1 to 10.6 GHz. Within the permitted frequency ranges, the FCC also places a limit upon maximum transmit power.

In order to maximize data transmission rates and operating range, designers of UWB systems can simply transmit at the maximum permitted transmit power as specified by the FCC. An ideal pulse that can be used to transmit a signal in a UWB system that can make use of the entire permitted frequency band and that can fit the specified power spectral constraints would be a rectangular shaped signal in the frequency domain. Unfortunately, a rectangle in the frequency domain corresponds to an infinite duration sinc function in the time domain. Due to its infinite length in time and a large number of taps required to generate the signal the rectangular shaped signal is infeasible to implement.

A commonly used signal in UWB is known as the 'chirp.' Two different implementations of the chirp signal have been disclosed in previous patents. A first is called the Gaussian weighted sinusoidal function and the second is called the inverse-exponentially weighted sinusoidal function. The two versions of the chirp signal offer a good approximation of the rectangular shaped signal in the frequency domain, and therefore, are good candidates for use in a UWB system.

One disadvantage of the prior art is that there are signal components of the chirp signals exist at every frequency within the transmit frequency band. Therefore, if there are wireless communications systems operating within the general vicinity of the UWB system, the transmission of the chirp signals could pose interference problems. Furthermore, the transmissions from the wireless communications systems can also interfere with the communications of the UWB system.

A second disadvantage of the prior art is that in order to provide a good approximation of the rectangular shape, a relatively large number of taps may be needed. The large number of taps can make it difficult to actually implement the pulse in a UWB system.

SUMMARY OF THE INVENTION

These and other problems are generally solved or circumvented, and technical advantages are generally achieved, by preferred embodiments of the present invention which provides for a method for designing transmit pulses for ultra-wideband communications systems.

In accordance with a preferred embodiment of the present invention, a method for forming a quantized representation of a pulse comprising specifying a spectral mask for the pulse, applying an optimization routine to compute samples of the quantized representation of the pulse, wherein the optimization routine minimizes a difference between the quantized representation of the quantized representation and the pulse, and storing the samples of the quantized representation of the pulse is provided.

In accordance with another preferred embodiment of the present invention, a method for transmitting a pulse to mitigate interference comprising determining the presence of interferers, specifying a spectral mask for the pulse, wherein the spectral mask is used to describe a frequency response of the pulse, and wherein if the interferers occupy a portion of the spectral mask intended to carry signal, then portions of the spectral mask corresponding to frequencies of the interferers are set to carry significantly less signal than portions corresponding to frequencies intended to carry signal, computing the pulse based on the spectral mask, and providing the pulse to an antenna is provided.

In accordance with a preferred embodiment of the present invention, a method of transmitting a pulse comprising creating a representation of a sample of the pulse based upon information about the sample, wherein the pulse has a variation of more than a specified value across its pass band, providing the representation to an antenna to transmit the representation of the sample, and repeating the creating and providing until all samples of the pulse have been transmitted is provided.

An advantage of a preferred embodiment of the present invention is that a good approximation of the rectangular shaped signal in the frequency domain can be achieved with a relatively small number of taps. This can allow for simple and inexpensive implementations of a UWB communications system.

A further advantage of a preferred embodiment of the present invention is that in the presence of interferers, portions of the transmit frequency band can be eliminated. This can reduce the UWB system's interference to other wireless communications systems.

Yet another advantage of a preferred embodiment of the present invention is that by not transmitting data in portions of the frequency band where interference is occurring, the UWB system can actually perform better, since transmitted data is not being damaged and possibly requiring retransmissions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a UWB communications system operating within FCC specified regulations. The FCC specified rules can be found in a Report Order entitled "Revision of Part 15 of the Commission's Rules Regarding Ultra-Wideband Transmission Systems," released Apr. 22, 2002, which is herein incorporated by reference. The invention may also be applied, however, to other UWB communications systems operating within other portions of the world, wherein the FCC's regulations do not apply. Furthermore, the invention may be applied to UWB communications systems that use only any portion of the allowed spectrum, not just all of it. The invention can have application to non-UWB communications systems that may have a need for a pulse with a certain bandwidth which has a need for certain portions of the bandwidth notched out.

Figure 1:
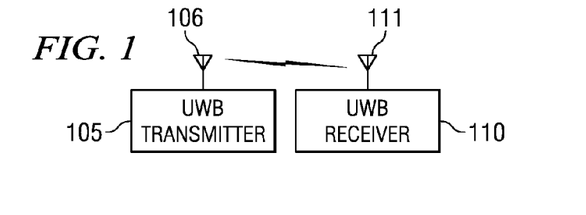
FIG. 1 is a diagram of an exemplary ultra-wideband (UWB) wireless communications system.

With reference now to FIG. 1, there is shown an exemplary ultra-wideband (UWB) wireless communications system. The UWB wireless communications system as displayed includes a UWB transmitter 105 and a UWB receiver 110. The UWB transmitter 105 may use an antenna 106 in its transmitting, while the UWB receiver 110 may use an antenna 111 to receive the transmitted signals. Note that while the UWB wireless communications system is illustrated with a single receiver and a single transmitter, there can be and typically are more than one receiver and one transmitter in a wireless communications system.

A majority of UWB communications systems use streams of short duration pulses to encode and transmit data, although in the strictest sense, any wireless communications system is classified as an UWB communications system if the bandwidth of the signal being transmitted, $f_B$, is greater than or equal to 0.20 $f_c$, where $f_c$ is the center frequency of the signal being transmitted. Additionally, the UWB communications system should have a minimum bandwidth of 500 MHz. Therefore, other data encoding and transmission methodologies can be employed by UWB communications systems.

Figure 2:
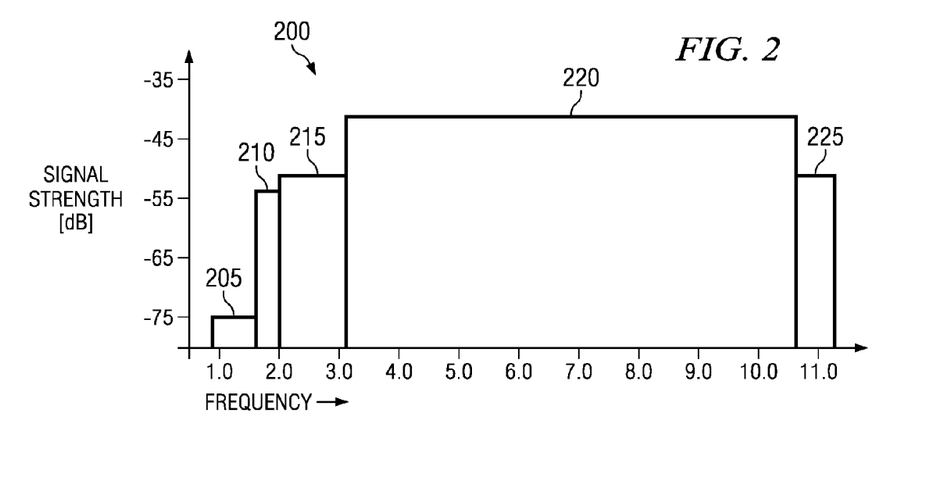
FIG. 2 is a diagram of a spectral mask for an indoor UWB system.

With reference now to FIG. 2, there is shown a diagram illustrating a spectral mask 200 for an indoor UWB system. According to FCC regulations, a UWB system that is to be used in an indoor application must make sure that its transmissions fall within the spectral mask 200. For a frequency band between 960 to 1610 MHz, the UWB system must transmit at a power level of less than −75.3 dBm (shown in FIG. 2 as block 205). For a frequency band between 1610 to 1990 MHz, the transmit power level must be less than −53.3 dBm (block 210). In a frequency band between 1990 to 3100 MHz, the transmit power level needs to be less than −51.3 dBm (block 215), while the transmit power is limited to being less than −41.3 dBm within a frequency band from 3100 to 10600 MHz (block 220). Finally, for frequencies above 10600 MHz, the transmit power is required to be less than −51.3 dBm (block 225). Note that in portions of the spectral mask where no signal is to be transmitted, the spectral mask can take on essentially zero values (large negative values when represented in dBm).

Note that FIG. 2 illustrates a spectral mask for an indoor UWB system. The FCC specifies spectral masks for other types of UWB systems, such as hand-held UWB systems, vehicular radar UWB systems, and UWB imaging systems. Each type of UWB system has a different spectral mask that is intended to help prevent the system from causing undue interference to existing systems. Furthermore, other countries and regions of the world may have other restrictions on UWB systems. Therefore, although the discussion of the present invention focuses upon a UWB system operating under FCC regulations, it should be understood that these limitations should not be a limiting factor upon the present invention.

Figure 3A:
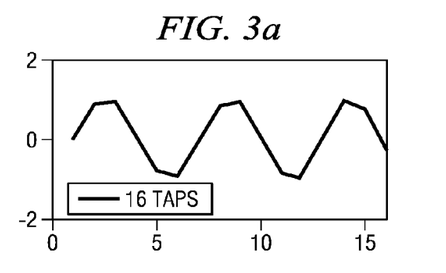
FIGS. 3a through 3f are time and frequency domain plots for exemplary Gaussian weighted sinusoidal signals.
Figure 3B:
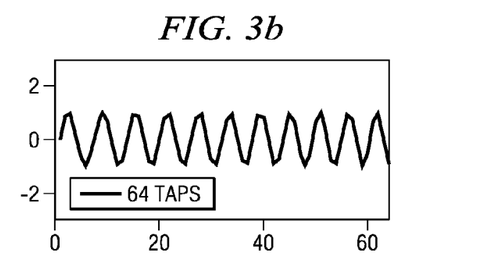
Figure 3C:
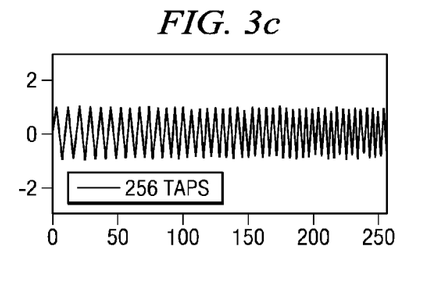
Figure 3D:
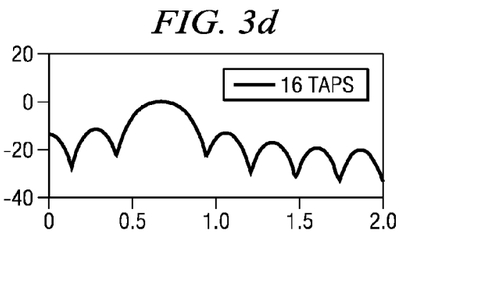
Figure 3E:
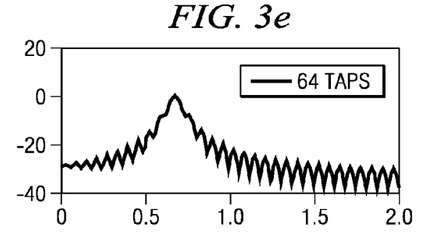
Figure 3F:
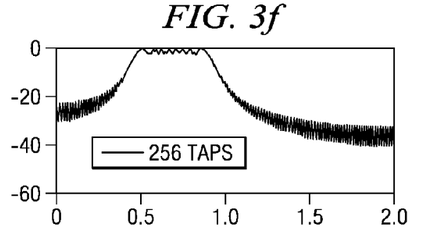

With reference now to FIGS. 3a through 3f, there are shown diagrams illustrating time and frequency domain plots of exemplary Gaussian weighted sinusoidal signals. FIGS. 3a through 3c illustrate time domain plots of exemplary Gaussian weighted sinusoidal signals with 16, 64, and 256 taps respectively. FIGS. 3d through 3f illustrate frequency domain plots of the same exemplary Gaussian weighted sinusoidal signals in FIGS. 3a through 3c. Note that as the number of taps (samples) increase, the frequency response of the Gaussian weighted sinusoidal signals approach that of the desired rectangular pulse.

Figure 4A:
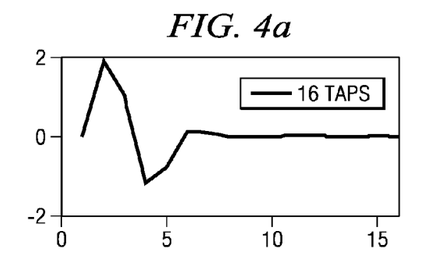
FIGS. 4a through 4f are time and frequency domain plots for exemplary inverse-exponentially weighted sinusoidal signals.
Figure 4B:
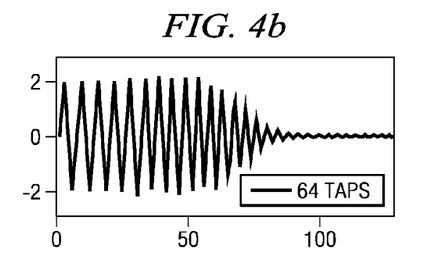
Figure 4C:
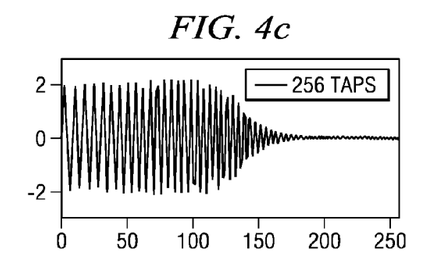
Figure 4D:
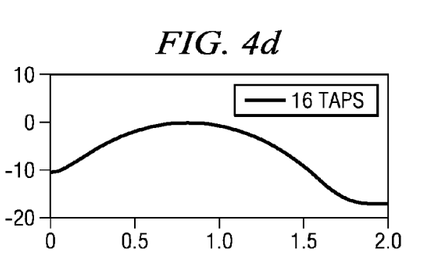
Figure 4E:
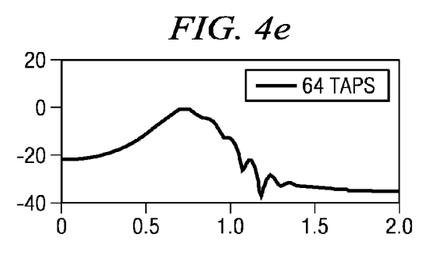
Figure 4F:
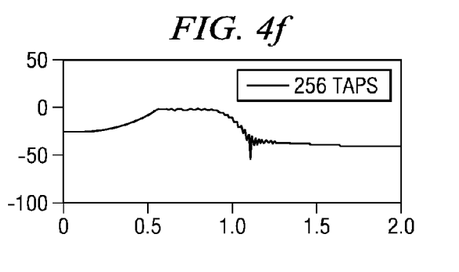

With reference now to FIGS. 4a through 4f, there are shown diagrams illustrating time and frequency domain plots of exemplary inverse-exponentially weighted sinusoidal signals. FIGS. 4a through 4c illustrate time domain plots of exemplary inverse-exponentially weighted sinusoidal signals with 16, 64, and 256 taps respectively. FIGS. 4d through 4f illustrate frequency domain plots of the same exemplary inverse-exponentially weighted sinusoidal signals in FIGS. 4a through 4c. Note that as the number of taps (samples) increase, the frequency response of the inverse-exponentially weighted sinusoidal signals approach that of the desired rectangular pulse. Note however, that the frequency response of the inverse-exponentially weighted sinusoidal signals does not approach the frequency response of the rectangular pulse as quickly as does the Gaussian weighted sinusoidal signal displayed in FIGS. 3a through 3f.

Figure 5:
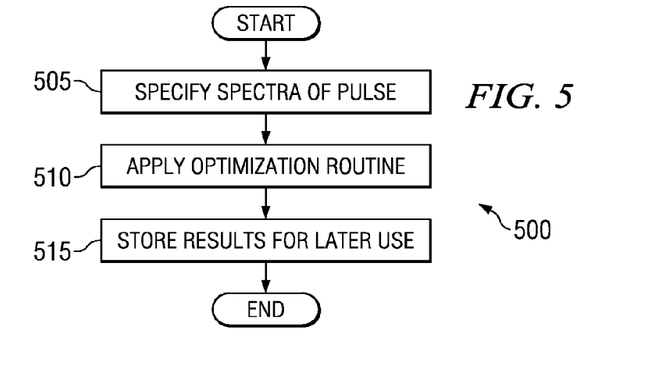
FIG. 5 is a diagram of a process for pulse design using filter design techniques, according to a preferred embodiment of the present invention.

With reference now to FIG. 5, there is shown a diagram illustrating a process 500 for pulse design using filter design techniques, according to a preferred embodiment of the present invention. According to a preferred embodiment of the present invention, a pulse's frequency domain characteristics can be specified and then, using filter design techniques, a time domain signal with frequency domain characteristics similar to the specified characteristics can be created.

To start the pulse design process 500, a set of frequency domain characteristics for the pulse should be specified (block 505). The set of frequency domain characteristics can include portions of the frequency spectra where there should be no signal components (this can correspond to the filter's stop band(s)) and portions of the frequency spectra where there should be signal components (this may correspond to the filter's pass band(s)). For example, for a UWB system that is to be used indoors, an exemplary set of frequency domain characteristics can be: stop band 1=less than 3600 MHz, pass band=3600 to 10150 MHz, stop band 2=greater than 10150 MHz. Note that the stop band and pass bands specified may not go completely to the edges of the frequency bands as specified by the FCC. This may be due to the presence of a transition band between the pass and stop bands of a filter. Additionally, by stopping short of the edges, the frequency spectra of the pulse can be ensured of meeting FCC regulations.

As discussed previously, an ideal signal to represent the frequency domain characteristics of the pulse would be a perfect rectangle, $H_i(\omega)$. A perfect rectangle in the frequency domain would be an infinite length filter in the time domain, therefore, making it impossible to implement. However, a finite length approximation can be used. An equation for an N+1 tap (sample) signal can be expressed as:

$$H(\omega) = \sum_{n=0}^{N} h(n)e^{-j\omega n}. \quad (1)$$

If h[n], the time function, is restricted to being a real valued function with even symmetry, $H(\omega)$ can be re-written as:

$$H(\omega) = A(\omega)e^{j(\theta_1 + \theta_2 \omega)} \quad (2)$$

wherein $A(\omega)$ is a real amplitude function and $H(\omega)$ has linear phase. A further simplification shows that $H(\omega)$ can be written as the sum of cosine terms:

$$H(\omega) = e^{-j\omega N/2}[(h_0 + h_N)\cos(\omega N/2) + j(h_0 - h_N)\sin(\omega N/2) + \ldots + (h_{N/2-1} + h_{N/2+1})\cos(\omega(N/2-1)) + j(h_{N/2-1} - h_{N/2+1})\sin(\omega(N/2-1))] \quad (3)$$

By observation, $\theta_1 = 0$ and $\theta_2 = N/2$. Solving for $A(\omega)$ gives:

$$A(\omega) = \sum_{m=0}^{N/2-1} 2h[n]\cos(\omega(N/2 - m)). \quad (4)$$

An optimization technique can now be applied to minimize the difference between the infinite length ideal signal, the perfect rectangle, $H_i(\omega)$, and the finite length (N+1 tap) filter, $H(\omega)$ (block 510). Many different optimization techniques can be used, such as the least squares techniques, weighted least squares techniques, minimum mean square techniques, constrained optimization techniques, generalized Remez algorithm, and so on. The least squares and minimum mean square techniques for optimization are considered to be well known by those of ordinary skill in the art of the present invention. As an example, the use of the least squares technique to optimize $H(\omega)$ is presented below.

Let an error function be defined as the difference between the perfect rectangle, $H_i(\omega)$, and the filter of length N+1, $H(\omega)$, at L different points. The error function can be expressed as:

$$Error = \sum_{k=0}^{L-1} |H(\omega_k) - H_i(\omega_k)|^2. \quad (5)$$

Perhaps to better attain the desired frequency response, a weighting function, $W(\omega_k)$, can more heavily weight the error in certain areas of the frequency spectra as to make those areas more closely approximate the perfect rectangle. The error function can then be expressed as:

$$Error = \sum_{k=0}^{L-1} W(\omega_k)|H(\omega_k) - H_i(\omega_k)|^2. \quad (6)$$

Through the use of Parseval's Theorem which states that the energy of a signal in the time domain is equal to the energy of that signal in the frequency domain, the above error function can be simplified to:

$$Error = \sum_{m=-(L-1)/2}^{m=(L-1)/2} w'_m |h_m - (h_i)_m|^2. \quad (7)$$

Note that the terms of h[n] that are outside of the N terms centered about the origin may be equal to zero, so the square of the terms of the perfect rectangle for L−1>|n|>N/2 just adds to the error measurement. The error function can further simplify to:

$$Error = \sum_{m=-N/2}^{m=N/2} w'_m |h_m - (h_i)_m|^2 + \sum_{m=N/2+1}^{L-1} |(h_i)_m|^2. \quad (8)$$

In order to find a closed form solution for minimizing the error for a given weighting function, the equation for A(ω) (equation 4) can be rewritten in matrix algebra:

$$F\vec{h} = W\vec{a}, \quad (9)$$

wherein $\vec{h}$ is an N/2 length vector (since the signal is real and has linear phase, only one half of the taps need to be solved for), F is a L×(N/2) matrix where $F_{ij}=\cos(\omega_i(N/2-m_j))$, W is a L×L matrix and $\vec{a}$ is a length L vector of frequency samples of the real valued amplitude function A(ω).

The weighting vector, $\vec{a}$, can be written as the sum of the ideal response and an error term:

$$Fh = W\vec{a}_i + \vec{e}. \quad (10)$$

In order to minimize the squared error, $e^T e$ should be equal to zero and be perpendicular to $W\vec{a}_i$. By multiplying the above equation (equation 10) through by $e^T$, it is clear that $e^T F$, or equivalently, $F^T e$ should be equal to the zero vector. Multiplying equation 10 by $F^T$, and solving for $\vec{h}$ yields the closed form solution for the least squares signal:

$$\vec{h} = (F^T WF)^{-1} F^T W \vec{a}_i. \quad (11)$$

Equation 11 was solved for various numbers of taps (N) and for several different weighting functions. In each case, L=N/2. A table below displays the specifications for several pulses with variation in the number of taps, weighting functions, and sets of frequency domain characteristics.

| # Taps | Stopband1 (MHz) | Passband (MHz) | Stopband2 (MHz) | $W_{S1}$ | $W_P$ | $W_{S2}$ |
|---|---|---|---|---|---|---|
| 16 | <3600 | 3600-10150 | >10150 | 10 | 1 | 10 |
| 33 | <3600 | 3600-10150 | >10150 | 3 | 1 | 3 |
| 65 | <3350 | 3350-10350 | >10350 | 2 | 1 | 2 |
| 129 | <3300 | 3300-10350 | >10350 | 2 | 1 | 2 |
| 257 | <3300 | 3300-10400 | >10400 | 1 | 1 | 1 |
| 513 | <3100 | 3100-10600 | >10600 | 1 | 1 | 1 |
| 1025 | <3100 | 3100-10600 | >10600 | 1 | 1 | 1 |

Note that for larger number of taps, the values of the weighting functions in the stop bands can be decreased to provide the optimization technique greater freedom. When there is a small number of taps, the values of the weighting functions in the stop bands can be large to place greater emphasis on the optimization of the stop bands (to ensure that there are no frequency components in the prohibited frequency bands).

After the optimization routine has been applied (block 510), the taps of the filter can be stored for later use (block 515). According to a preferred embodiment of the present invention, the filter taps can be stored in coefficient form in a memory or a look-up table. Alternatively, the filter taps can be stored as a sequence of control and timing signals for a circuit that can be used to create the pulse. For example, if a multi-switch circuit is to be used to create the pulse, then each filter tap can be stored as a combination of switch settings required to create the particular filter tap. Additionally, further pieces of information such as information regarding the duration of time to hold each switch setting can be stored with the switch settings.

Figure 6A:
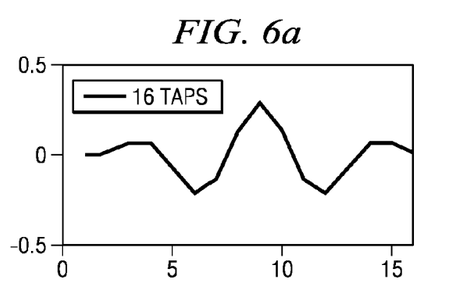
FIGS. 6a through 6f are time and frequency domain plots of signals approximating the perfect rectangle signal created using the least squares optimization technique, according to a preferred embodiment of the present invention.
Figure 6B:
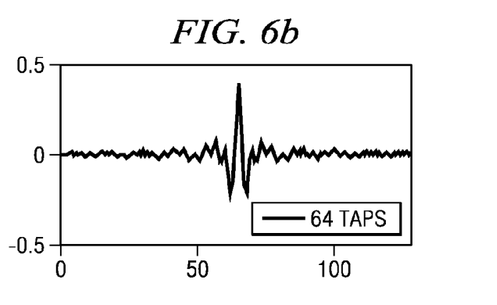
Figure 6C:
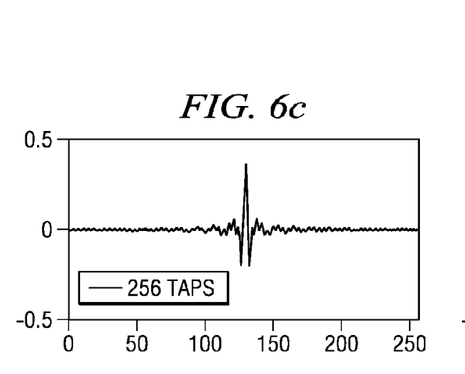
Figure 6D:
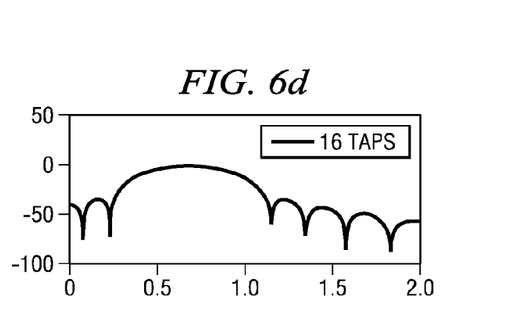
Figure 6E:
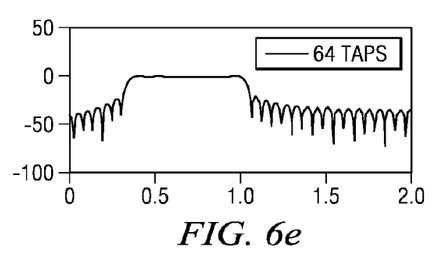
Figure 6F:
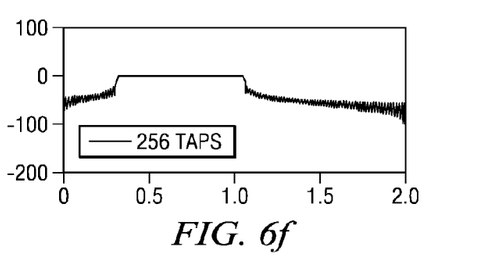

With reference now to FIGS. 6a through 6f, there are shown diagrams illustrating time and frequency domain plots of signals approximating the perfect rectangle signal created using the least squares optimization technique, according to a preferred embodiment of the present invention. FIGS. 6a through 6c illustrate time domain plots of the approximations of the perfect rectangle signals with 16, 64, and 256 taps respectively. FIGS. 6d through 6f illustrate frequency domain plots of the same approximations of the perfect rectangle shown in FIGS. 6a through 6c. Note that as the number of taps (samples) increase, the frequency response of the approximations approaches that of the desired perfect rectangular signal. Note that in comparison with the Gaussian weighted and inverse-exponentially weighted sinusoidal signals illustrated in FIGS. 3a through 3f and 4a through 4f, the frequency domain plots of the approximations comes closer to the perfect rectangle signal. Additionally, the attenuation is greater in portions of the frequency band where no signal should be present.

Figure 7:
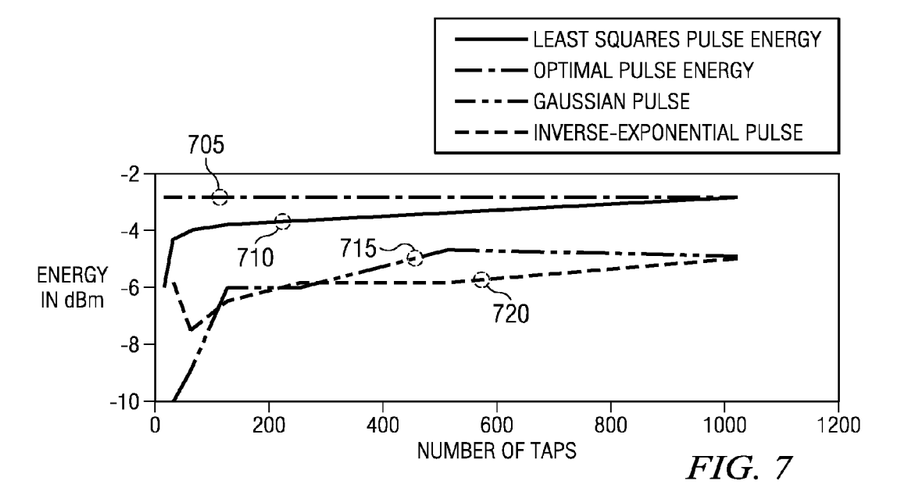
FIG. 7 is a data plot of signal energy versus signal length, according to a preferred embodiment of the present invention.

With reference now to FIG. 7, there is shown a data plot illustrating signal energy versus signal length (in number of taps (samples)), according to a preferred embodiment of the present invention. A first curve 705 displays the energy present in the perfect rectangle signal. Since the perfect rectangle is an ideal signal with infinite length, the number of taps does not apply and has no effect upon the energy. A second curve 710 displays the energy present in a signal created using the least squares optimization of the approximation to the perfect rectangle signal. The second curve 710 shows that even for a small number of taps, the approximation signal has an energy that can come close to the energy present in the perfect rectangle signal and that for a large number of taps, the approximation signal has an energy that can approach that of the perfect rectangle signal.

A third curve 715 displays the energy present in a Gaussian weighted sinusoidal signal while a fourth curve 720 displays the energy present in an inverse-exponentially weighted sinusoidal signal. Clearly, the energy levels present in the Gaussian weighted sinusoidal signal (the third curve 715) and the inverse-exponentially weighted sinusoidal signal (the fourth curve 720) does not come close to approaching the energy in the perfect rectangle signal, even for large values of the number of taps. In terms of signal energy, the Gaussian weighted sinusoidal signal and the inverse-exponentially weighted sinusoidal signal are not good approximations of the perfect rectangle.

In real world situations, even when operating within FCC specified regulations, wireless communications devices may receive interference from other electronic and electrical devices operating nearby. Furthermore, the wireless communications devices may be a source of undesired interference to existing electronic devices operating nearby. For example, within the permitted frequency band of UWB systems is the Unlicensed National Information Infrastructure (UNII) band (from 5.15 to 5.825 GHz). Devices operating within the UNII band have no restriction upon use (besides maximum transmit power) with the exception that they do not cause interference upon other devices operating within the same band and that they are capable of operating in the presence of interference from other devices. An example of devices that operate within the UNII band would be the class of communications devices that are compliant to the IEEE 802.11a technical specifications. Note that there may be other devices transmitting within frequency bands other than the UNII band that may interfere with or be interfered by UWB systems. Therefore, the present invention should not be construed as being limited to operating with interference from (and to) devices operating in the UNII band.

While these devices (both UNII devices and UWB systems) are required to be able to tolerate interference, the presence of interference can result in degraded performance. Therefore, to minimize the impact of these systems operating within the same vicinity, it may be best if UWB systems do not transmit any signal within the UNII band (if there are UNII devices operating nearby). However, the Gaussian weighted sinusoidal and inverse-exponentially weighted sinusoidal signals cannot be readily modified to transmit no frequency components within a desired frequency band.

Figure 8:
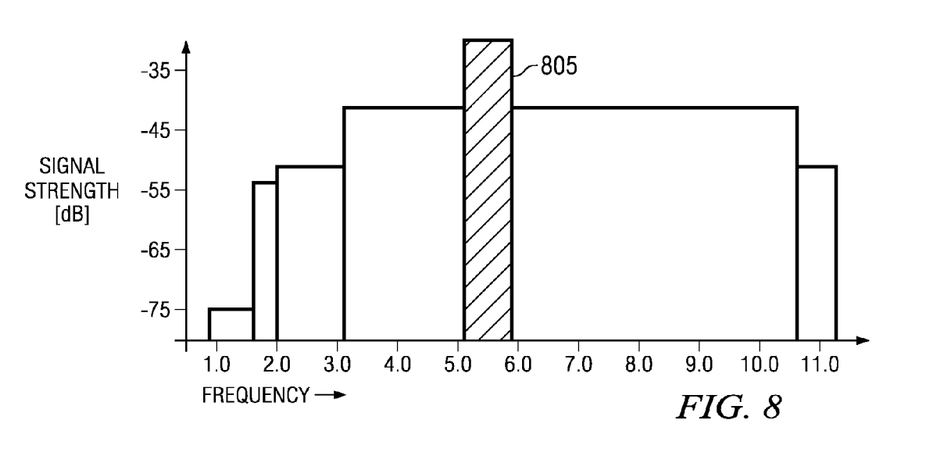
FIG. 8 is a diagram of a spectral mask with an interferer.

With reference now to FIG. 8, there is shown a diagram illustrating a spectral mask of a UWB communications system with an interferer. As shown in FIG. 8, there is an interferer (shown as shaded block 805) located within a frequency band from 5.15 to 5.825 GHz (the UNII band). Note that while the UWB transmission band can be significantly larger than that of a device operating in the UNII band, transmissions from the UNII device can have an impact on the UWB device and vice versa. Therefore, to eliminate interference to the UNII device (and to mitigate interference from the UNII device), the UWB device may elect to not transmit any signal within the UNII band portion of its transmit spectrum.

Figure 9:
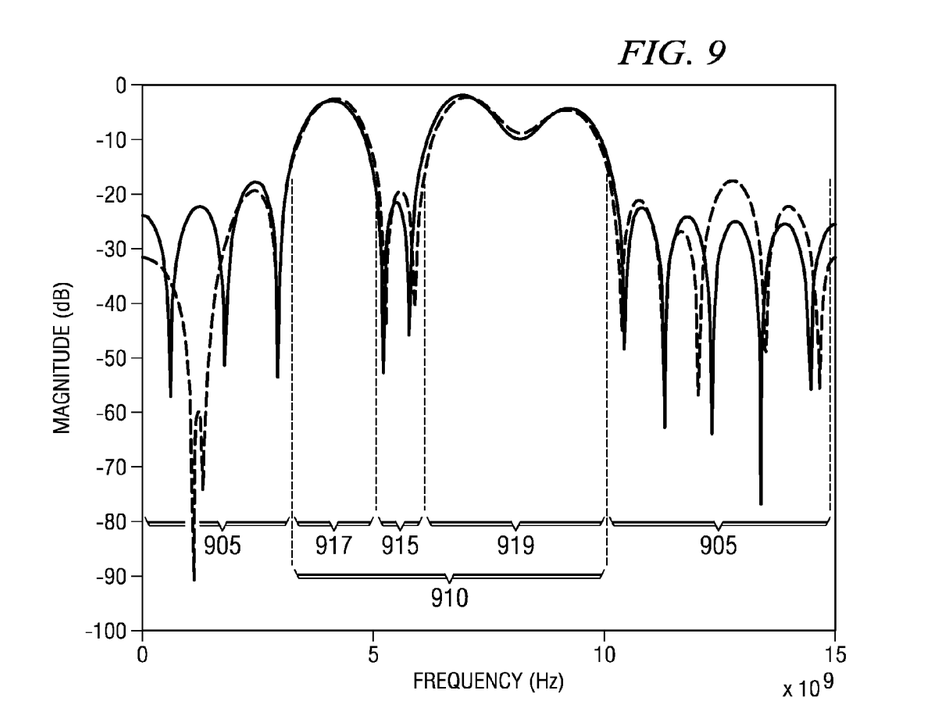
FIG. 9 is a data plot of a frequency response of a pulse for a UWB system wherein there is no transmit energy within a specified frequency band, according to a preferred embodiment of the present invention.

With reference now to FIG. 9, there is shown a plot illustrating a frequency response of a transmit pulse for a UWB system wherein the transmit pulse does not transmit any signal within a specified frequency band, according to a preferred embodiment of the present invention. FIG. 9 illustrates a frequency response of a transmit pulse, such as an approximation of the perfect rectangle created using the optimization technique discussed above. The frequency response of the transmitted pulse has a stop band 905 on either side of a transmit band 910, wherein the transmit band 910 is where the signal being transmitted is carried. However, within the transmit band 910, there may be a second stop band 915, which can effectively split the transmit band 910 into a first transmit band 917 and a second transmit band 919.

The second stop band 915 may have been intentionally created to prevent the UWB system from causing interference with and receiving interference from existing electronic devices operating within the general vicinity of the UWB system, such as other wireless communications systems, and so forth. Note that the magnitude of the second stop band 915 can be dependent upon the type and magnitude of the interferer. For example, if the interferer is large, then the magnitude of the second stop band 915 should also be large to remove the large interferer. If the interferer is relatively small, then the second stop band 915 does not need to be as large. Note that the present invention can support the exclusion of more than one frequency band. For example, if there are three frequency bands that a UWB system wishes to exclude from its transmission, then it can be possible for three stop bands to be placed into the frequency response of the approximation of the perfect rectangle.

Figure 10:
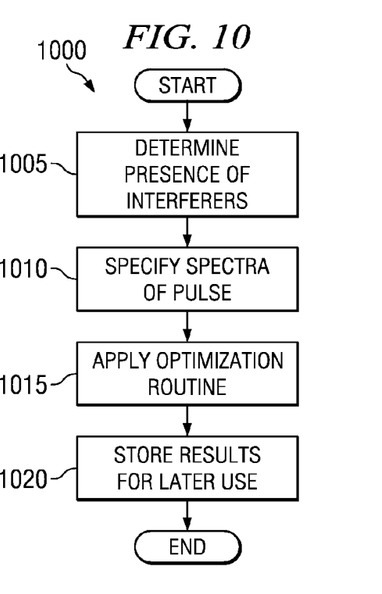
FIG. 10 is a diagram of a process for pulse design using filter design techniques, wherein portions of the frequency response of the pulse can be modified in response to interferers, according to a preferred embodiment of the present invention.

With reference now to FIG. 10, there is shown a diagram illustrating a process 1000 for pulse design using filter design techniques, wherein portions of the frequency response of the pulse can be modified in response to interferers, according to a preferred embodiment of the present invention. The pulse design process 1000 can be similar to the pulse design process 500 (FIG. 5) with additional support for modifying the frequency response of the pulse being designed to accommodate the presence of interference from electrical and electronic devices operating nearby.

To start the pulse design process 1000, the presence of interferers can be determined (block 1005). According to a preferred embodiment of the present invention, interferers can be determined by scanning the transmission band of the UWB system. Then, any interferers detected can be used in the specification of the spectra of the pulse (block 1010). The scanning for interferers can occur during a power-up sequence for the UWB system. Alternatively, the scanning can occur periodically during the operation of the UWB system or when the performance of the UWB system degrades below a specified threshold. According to another preferred embodiment of the present invention, interferers can be detected based on a combination of received signal strength indicator (RSSI) and packet error rate (PER) measurements. For example, if the RSSI is high but PER is also high, then the probability of an interferer is also high. According to yet another preferred embodiment of the present invention, rather than performing a scan of the transmission band for interferers, a user of the UWB system can enter known sources of interference (such as other wireless communications systems) operating in close proximity to the UWB system during the configuration of the UWB system.

After the interferers have been determined, either by scanning or user input, (block 1005) and the spectra of the pulse to be designed has been specified (block 1010), an optimization technique, such as the least squares optimization discussed previously, can be applied (block 1015). Once the pulse has been designed, the results of the pulse design can be stored for later use (block 1020).

Figure 11:
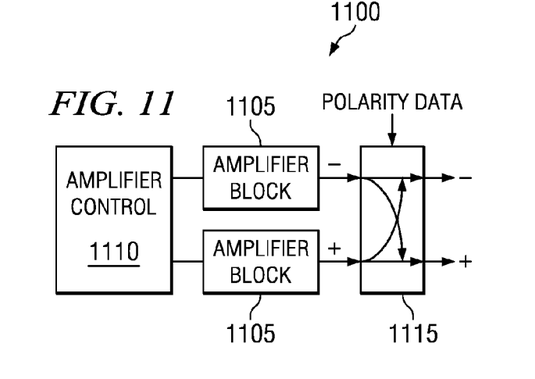
FIG. 11 is a diagram of a circuit to generate a quantized representation of an analog pulse, according to a preferred embodiment of the present invention.

With reference now to FIG. 11, there is shown a circuit 1100 to generate a quantized representation of an analog pulse, wherein the circuit 1100 produces a differential mode output, according to a preferred embodiment of the present invention. Note that with minor modifications, the circuit 1100 can be changed to produce a single ended output by persons of ordinary skill in the art of the present invention without requiring a significant amount of changes to the circuit 1100 or effort. A more detailed discussion of the circuit 1100 can be found in a co-pending and co-assigned patent application entitled "Ultra-Wideband (UWB) Transmitter Architecture," filed Jan. 2, 2003, Ser. No. 10/335,717, which is incorporated herein by reference.

A pair of amplifier blocks 1105 can be used to produce a differential output signal based upon control signals produced by an amplifier control 1110. The amplifier control 1110 may make use of information needed to recreate the analog pulse which was stored in a memory (not shown). The information stored in the memory about the analog signal may have been created using the pulse design process 500 (FIG. 5) or 1000 (FIG. 11) as discussed above. As discussed previously, the stored information may be actual samples of the analog pulse or it may be amplifier block setting information that can be used to create a sample of the analog pulse. Furthermore, the amplifier control 1110 may also retrieve timing information from the memory. The timing information may tell the amplifier control 1110 how long to maintain the current sample, for example. Alternatively, the information used in the recreation quantized version of the analog pulse may be pre-programmed into the circuit 1100, such as in the pair of amplifier blocks 1105 or in the amplifier control 1110.

Output from the pair of amplifier blocks 1105, a positive output and a negative output, may then be provided to a switching unit 1115. The switching unit 1115 can be controlled by polarity data which can also be provided by the amplifier control 1110 or retrieved directly from the memory or pre-programmed. The switching unit 1115 can be used to switch the positive output and the negative output to produce an output of opposite polarity.

In order to produce a quantized representation of the analog pulse, the amplifier control 1110 may retrieve information about the quantized version of the analog pulse from where the information is stored (perhaps a sample at a time or an entire group of samples corresponding to the quantized analog pulse) and then, a sample at a time, the amplifier control 1110 can produce control signals to provide to the pair of amplifier blocks 1105. The pair of amplifier blocks 1105, based upon the control signals provided by the amplifier control 1110, could then produce a differential mode output signal corresponding to the sample. After having the pair of amplifier blocks 1105 maintain the differential mode output signal for a period of time corresponding to the sampling period of the quantized signal, the amplifier control 1110 can generate control signals for the next sample.

As an alternative to the circuit 1100, a high speed digital-to-analog converter (DAC) can be used to perform the conversion of sample information to the quantized representation of the analog pulse. The DAC would need to be able to operate at a sufficiently high frequency so that it can generate the quantized representation of the analog pulse at the desired rate. The DAC may be provided the sample information (one at a time) and it would convert the sample information into a voltage representation which could then be provided to transmit circuitry.

Figure 12:
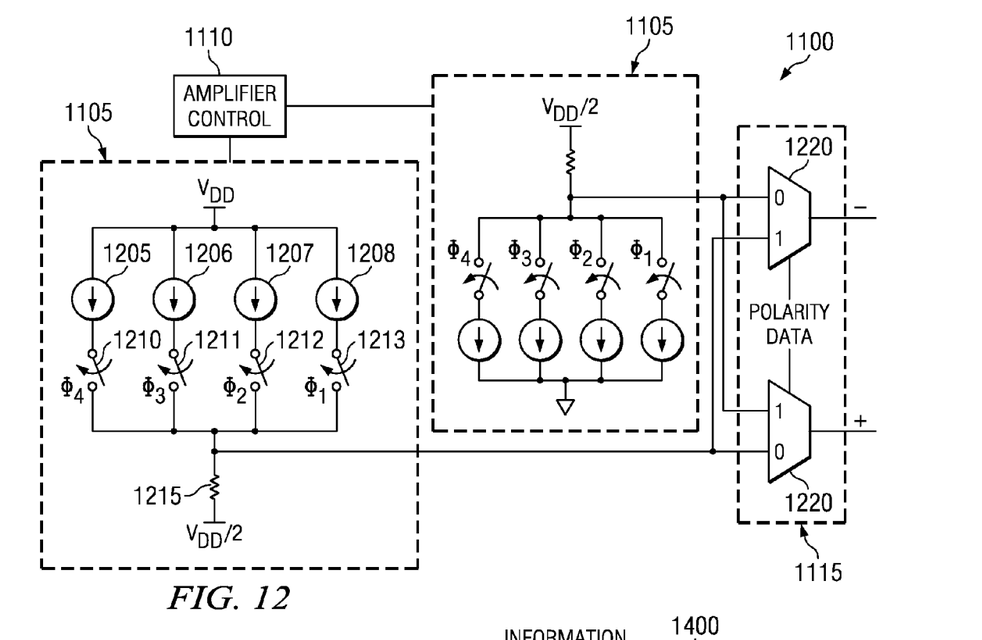
FIG. 12 is a diagram of an implementation of the circuit 1100 used to generate a quantized representation of an analog pulse, according to a preferred embodiment of the present invention.

With reference now to FIG. 12, there is shown a diagram illustrating an implementation of the circuit 1100 used to generate a quantized representation of an analog pulse, according to a preferred embodiment of the present invention. The amplifier blocks 1105 may be implemented using a single design, with the exception of the values of the power rails. Therefore, the discussion of a single amplifier block will sufficiently describe both amplifier blocks 1105.

The amplifier block 1105 features four amplifiers 1205, 1206, 1207, and 1208. The number of amplifiers in the amplifier block 1105 can be a function of the number of quantization bits used to represent the analog pulse. For example, if there are three quantization bits, then four amplifiers may be needed to represent four different quantization levels (the third quantization bit may be used to represent the sign of the analog pulse (the polarity data) and can be used to control the switching unit 1115 (FIG. 11)). If there are four quantization bits, then eight amplifiers may be needed. According to a preferred embodiment of the present invention, each of the four amplifiers 1205, 1206, 1207, and 1208 is identical to one another, producing essentially the same amount of current (or as closely equal as possible per manufacturing methods used to create the amplifiers). The use of identical currents in each of the amplifiers implements what is commonly referred to as thermometer scaling.

All four amplifiers 1205, 1206, 1207, and 1208 are connected together at one end to a power rail, for example, Vdd. Each of the four amplifiers is also connected to a switch 1210, 1211, 1212, and 1213 (for example, amplifier 1205 is connected to a switch 1210). Each of the four switches (1210, 1211, 1212, and 1213) is controlled by a control signal, $\phi$, produced by the amplifier control 1110. For example, switch 1210 is controlled by control signal $\phi_4$, while switch 1211 is controlled by control signal $\phi_3$, etc. The control signals selectively couple and decouple their respective amplifiers to a current path that includes a resistor 1215. When a switch is closed by its respective control signal, current can flow from the amplifier through the resistor 1215, producing a voltage drop across the resistor 1215. If more than one switch is closed, then the combined current is dropped across the resistor 1215, producing a larger voltage drop across the resistor 1215.

The voltage drop across the resistor 1215 and the corresponding voltage drop across a similar resistor (shown, but not labeled) in the second amplifier block 1105 are provided to a pair of multiplexers 1220. The multiplexers 1220 are used to selectively couple the outputs of the pair of amplifier blocks 1105 to the output of the circuit 1100. The multiplexers 1220 may be controlled by the polarity data (for example, the first bit of the three-bit digital representation of the signal (the polarity bit)), which selectively selects one of two inputs of each of the two multiplexers 1220 and produces them at the output of the circuit 1100. Note that since the circuit 1100 generates a differential output, the actual output signal is carried on two signal lines.

Figure 13:
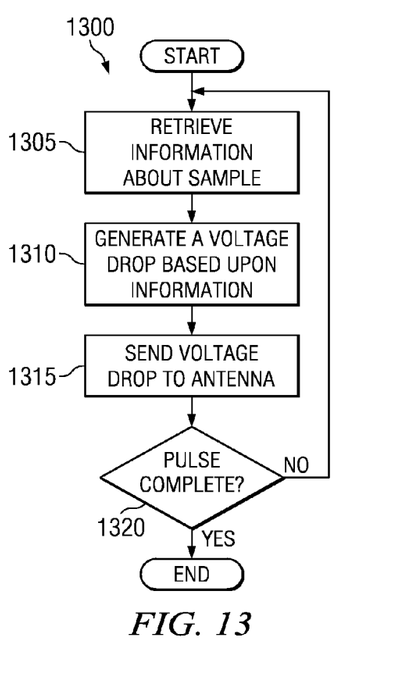
FIG. 13 is a diagram of a process for generating and transmitting a quantized representation of an analog pulse, according to a preferred embodiment of the present invention.

With reference now to FIG. 13, there is shown a diagram illustrating a process 1300 for generating and transmitting a quantized representation of an analog pulse, according to a preferred embodiment of the present invention. The process 1300 illustrates the generation and transmission of a quantized version of an analog pulse using circuitry such as the circuit 1100 (FIG. 11). The process 1300 can begin with the retrieval of information about a sample (or samples) of the quantized representation of the analog pulse (block 1305). The information may be stored in a memory (not shown) or some other storage device in a transmitter. Alternatively, if the quantized representation of the analog pulse requires very high frequency pulse, wherein the frequency may be greater than a frequency supportable by reading samples from a memory, then the information needed to generate the samples may be pre-programmed into the circuitry used to generate the quantized representation of the analog pulse. For example, the pre-programmed circuitry may be a part of the pair of amplifier blocks 1105 (FIG. 11) or the amplifier control 1110 (FIG. 11) or both.

Using the information retrieved from memory or using the pre-programmed information, the circuitry can generate a voltage drop corresponding to the sample of the quantized representation of the analog pulse (block 1310). Alternatively, the circuitry may generate a current corresponding to the sample. The voltage drop can then be provided to an antenna to be transmitted (block 1315). After the voltage drop has been provided to the antenna, a check can be made to determine if the entire analog pulse has been transmitted (block 1320). If the entire analog pulse has not been transmitted, then the process 1300 can be repeated to generate and transmit the next sample of the quantized representation of the analog pulse.

Figure 14:
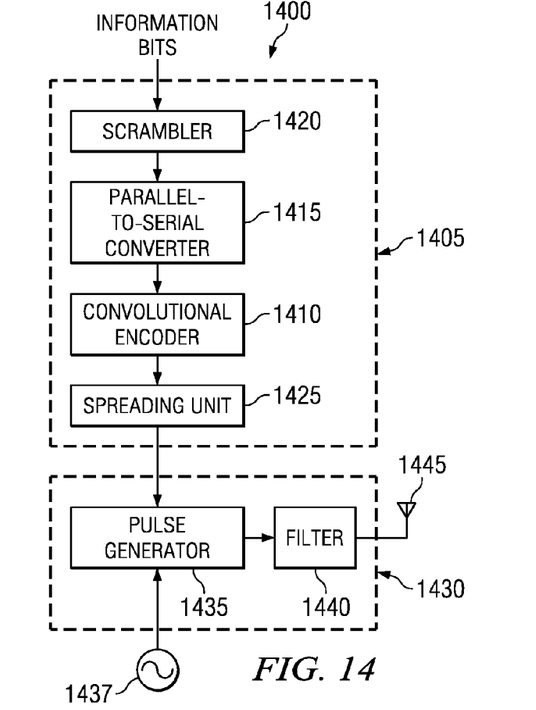
FIG. 14 is a high level block diagram of a UWB transmitter with a configurable pulse generator, according to a preferred embodiment of the present invention.

With reference now to FIG. 14, there is shown a high-level block diagram of an UWB transmitter 1400 with a configurable pulse generator 1435 according to a preferred embodiment of the present invention. The UWB transmitter 1400 is a fairly typical UWB transmitter in that it can be divided into two major portions, a digital portion 1405 and an analog portion 1430, plus an antenna 1445.

The digital portion 1405 is responsible for functions such as scrambling the serial data stream (for example, a scrambler 1420), converting the encoded information stream into a serial data stream (for example, a parallel-to-serial converter 1415), encoding (for example, a convolutional encoder 1410) a stream of information bits that is provided to the UWB transmitter 1400 by some information generator, such as a digital device or a user, etc., and spreading the scrambled serial data stream (for example, a spreading unit 1425). In other words, the digital portion 1405 of the UWB transmitter 1400 is responsible for converting the information bits into a form that is ready for transmission.

The analog portion 1430 receives the spread and scrambled serial data stream from the digital portion 1405 and then uses it to modulate the stream of short duration pulses. The analog portion 1430 includes the configurable pulse generator 1435, which is responsible for generating a generic pulse that is then modulated depending upon the value of a data bit (or chip) from the spread and scrambled serial data stream. The configurable pulse generator 1435 has as input, a clock 1437 (or an oscillator). After being modulated, the stream of short duration pulses is filtered by a filter unit 1440. The filter unit 1440 ensures that the transmission of the UWB transmitter 1400 conforms to any physical and regulatory restrictions placed upon the output of the UWB transmitter 1400.

Finally, the filtered stream of short duration pulses is provided to the antenna 1445 where it is transmitted over-the-air. Due to the large bandwidth of the UWB transmitter 1400, it is preferred that the antenna 1445 be an ultra-wideband antenna, i.e., the antenna 1445 has a bandwidth compatible with that of the bandwidth of the signal transmitted by the UWB transmitter 1400.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting a pulse, the method comprising:
    forming a quantized representation of the pulse, wherein the forming comprises
        specifying a spectral mask for the pulse,
        applying an optimization routine to compute samples of the quantized representation of the pulse, wherein the optimization routine minimizes a difference between the quantized representation of the pulse and the pulse, and
        storing the samples of the quantized representation of the pulse.

2. The method of claim 1 further comprising after the specifying, stating a number of samples in the quantized representation of the pulse.

3. The method of claim 1, wherein the spectral mask for the pulse specifies a frequency domain response for the pulse.

4. The method of claim 3, wherein the spectral mask specifies a non-zero portion in frequency bands of the pulse where the pulse is to carry information and an essentially zero portion in frequency bands of the pulse where the pulse is to not carry information.

5. The method of claim 4, wherein the non-zero portion has a positive value.

6. The method of claim 4, wherein the spectral mask can specify an essentially zero portion within a non-zero portion.

7. The method of claim 6, wherein the spectral mask can specify a plurality of essentially zero portions within a non-zero portion.

8. The method of claim 1, wherein the optimization treats the spectral mask as a desired frequency response for a filter and the filter's taps are the samples of the quantized representation of the pulse.

9. The method of claim 1, wherein the pulse is a wide-bandwidth pulse for use in an ultra-wideband communications system.

10. The method of claim 1, wherein the pulse is an ideal rectangular pulse.

11. The method of claim 1, further comprising transmitting the pulse.

12. A method for transmitting a pulse, the method comprising:
    forming a quantized representation of the pulse, wherein the forming comprises
        specifying a spectral mask for the pulse, and
        applying an optimization routine to compute samples of the quantized representation of the pulse, wherein the optimization routine minimizes a difference between the quantized representation of the and the pulse and treats the spectral mask as a desired frequency response for a filter and the filter's taps are samples of the quantized representation of the pulse, wherein the optimization comprises:
            writing a finite length approximation of the pulse, wherein the finite length is a number of samples of the pulse,
            determining an error function between the pulse and the finite length approximation of the pulse,
            applying the optimization routine to minimize the error function, and
            storing the samples of the quantized representation of the pulse.

13. The method of claim 12, wherein the optimization routine uses the least squares error minimization.

14. The method of claim 13, wherein the pulse is an infinite length sinc function expressible in the frequency domain as $H_i(\omega)$, wherein the finite length approximation of the pulse is expressible in the frequency domain as $$H(\omega) = \sum_{n=0}^{N} h(n)e^{-j\omega n},$$

and the error function is expressible as $$Error = \sum_{m=-N/2}^{m=N/2} |h_m - (h_i)_m|^2 + \sum_{m=N/2+1}^{L-1} |(h_i)_m|^2$$

where N+1 is the length of the finite length approximation of the pulse and L is an integer number.

15. The method of claim 12 further comprising after the determining, using a weighting function to place additional optimization emphasis on certain portions of the spectral mask.

16. The method of claim 15, wherein the weighting function is a positive value function, and wherein a larger value for the weighting function places additional optimization emphasis.

17. The method of claim 16, wherein the values of the weighting functions are non-zero positive integers, and wherein if no additional optimization emphasis is desired in a certain portion of the spectral mask, then an integer one is set for the value of the weighting function in the certain portion.

18. The method of claim 17, wherein large values of the weighting function are used in portions of the spectral mask where it is desired that the pulse is not to carry information.

19. The method of claim 16, wherein when the length of the finite length approximation is large, then the weighting function is not used.

20. The method of claim 16, wherein when the length of the finite length approximation is small, then additional importance is placed upon the values of the weighting function.

21. The method of claim 12, further comprising transmitting the pulse.

22. A method for transmitting a pulse to mitigate interference comprising:
    determining the presence of interferers;
    specifying a spectral mask for the pulse, wherein the spectral mask is used to describe a frequency response of the pulse, and wherein if the interferers occupy a portion of the spectral mask intended to carry signal, then portions of the spectral mask corresponding to frequencies of the interferers are set to carry significantly less signal than portions corresponding to frequencies intended to carry signal;
    computing the pulse based on the spectral mask, wherein the computing comprises applying an optimization routine to compute a quantized representation of the pulse, wherein the optimization routine minimizes a difference between the quantized representation of the pulse and the pulse; and
    providing the pulse to an antenna.

23. The method of claim 22, wherein the portions corresponding to frequencies of the interferers are set to carry no signal.

24. The method of claim 22, wherein the portions corresponding to frequencies of the interferers are set to carry at least 8 dB less signal than portions corresponding to frequencies intended to carry signals.

25. The method of claim 22, wherein an amount of difference in the signal carried in the portions corresponding to frequencies of the interferers and the portions corresponding to frequencies intended to carry signals can be dependent upon a measured magnitude of the interferers.

26. The method of claim 22, wherein the portions corresponding to the frequencies intended to carry signal are larger in frequency than the frequencies of the interferers.

27. The method of claim 22, wherein the pulse is a wide-bandwidth pulse for use in an ultra-wideband communications system, and wherein the determining comprises scanning a frequency band essentially equal to a frequency band of the pulse for the presence of interferers.

28. The method of claim 27, wherein the scanning occurs during an initial power on sequence.

29. The method of claim 27, wherein the scanning occurs when performance falls below a specified threshold.

30. The method of claim 22, wherein the pulse is a wide-bandwidth pulse for use in an ultra-wideband communications system, and wherein the determining comprises using frequencies associated with a list of electronic equipment operating in close proximity as identified interferers.

31. The method of claim 30, wherein the list is entered during equipment installation.

32. The method of claim 22, wherein a quantized version of the pulse can be stored and then subsequently retrieved when there is a need to transmit the pulse.

33. A method for transmitting a pulse to mitigate interference comprising:
    determining the presence of interferers wherein the pulse is a wide-bandwidth pulse for use in an ultra-wideband communications system, and wherein the determining comprises scanning a frequency band essentially equal to a frequency band of the pulse for the presence of interferers, wherein the scanning occurs when a received signal strength indicator (RSSI) measurement is high while an error rate measurement is also high;
    specifying a spectral mask for the pulse, wherein the spectral mask is used to describe a frequency response of the pulse, and wherein if the interferers occupy a portion of the spectral mask intended to carry signal, then portions of the spectral mask corresponding to frequencies of the interferers are set to carry significantly less signal than portions corresponding to frequencies intended to carry signal;
    computing the pulse based on the spectral mask; and
    providing the pulse to an antenna.

34. The method of claim 33, wherein the error rate measurement is a packet error rate (PER).

35. A method of transmitting a pulse comprising:
    computing samples of a pulse, wherein computing comprises applying an optimization routine to compute a quantized representation of the pulse, wherein
        the optimization routine minimizes a difference between the quantized representation of the pulse and the pulse, and
        the pulse has a variation of more than a specified value across its pass band;
    creating a representation of a sample of the pulse based upon information about the samples;
    providing the representation to an antenna to transmit the representation of the sample; and
    repeating the creating and providing until all samples of the pulse have been transmitted.

36. The method of claim 35, wherein there is more than one variation across the pulse's pass band.

37. The method of claim 35, wherein the information about the sample is retrieved from a memory.

38. The method of claim 35, wherein the information about the sample is preprogrammed into a circuit used to create the representation of the sample.

39. The method of claim 35, wherein the representation is a voltage drop.

40. The method of claim 35, wherein the representation is a current.

41. The method of claim 35, wherein the specified value is based on the type of interferer.

* * * * *